(12) United States Patent
Boddum

(10) Patent No.: US 12,378,034 B2
(45) Date of Patent: Aug. 5, 2025

(54) COLLAPSIBLE BOX

(71) Applicant: RE-ZIP ApS, Aarhus N (DK)

(72) Inventor: Bo Bach Boddum, Skødstrup (DK)

(73) Assignee: RE-ZIP ApS, Aarhus N (DK)

( * ) Notice: Subject to any disclaimer, the term of this patent is extended or adjusted under 35 U.S.C. 154(b) by 64 days.

(21) Appl. No.: 18/277,836

(22) PCT Filed: Feb. 11, 2022

(86) PCT No.: PCT/DK2022/050025
§ 371 (c)(1),
(2) Date: Aug. 18, 2023

(87) PCT Pub. No.: WO2022/174875
PCT Pub. Date: Aug. 25, 2022

(65) Prior Publication Data
US 2024/0124187 A1    Apr. 18, 2024

(30) Foreign Application Priority Data

Feb. 20, 2021 (DK) .......................... PA 2021 00185

(51) Int. Cl.
| | | |
|---|---|---|
| *B65D 5/36* | (2006.01) | |
| *B65D 5/20* | (2006.01) | |
| *B65D 5/24* | (2006.01) | |
| *B65D 5/66* | (2006.01) | |

(52) U.S. Cl.
CPC ......... *B65D 5/3664* (2013.01); *B65D 5/2066* (2013.01); *B65D 5/241* (2013.01); *B65D 5/6673* (2013.01); *B65D 2313/02* (2013.01)

(58) Field of Classification Search
CPC .... B65D 5/3664; B65D 5/2066; B65D 5/241; B65D 5/6673; B65D 2313/02; B65D 5/3657; B65D 5/6655; B65D 2313/04; B65D 11/1853; B65D 5/3642; B65D 1/225; B65D 21/086; B65D 27/06; B65D 5/36; B65D 5/3635; B65D 5/4287; Y02W 30/80; B31B 2120/302
USPC ...... 229/117.01, 117.05, 108.1, 117.08, 172, 229/176, 186; 220/4.29, 7, 6; 206/170
See application file for complete search history.

(56) References Cited

U.S. PATENT DOCUMENTS

| | | | |
|---|---|---|---|
| 2,220,122 A | * | 11/1940 | Ringler ................ B65D 5/3664 |
| | | | 229/172 |
| 2,381,067 A | | 8/1945 | Lowey |
| 4,331,231 A | | 5/1982 | Boyle |

(Continued)

FOREIGN PATENT DOCUMENTS

| | | |
|---|---|---|
| CN | 209634871 U | 11/2019 |
| CN | 209834234 U | 12/2019 |

(Continued)

*Primary Examiner* — Christopher R Demeree
(74) *Attorney, Agent, or Firm* — Flaster Greenberg P.C.

(57) ABSTRACT

A folding or collapsible box comprises a top panel, a bottom panel, a first and a second pair of opposed walls, and a globe. The first pair of opposed walls are extended from right and left edges of the bottom panel, configured to collapse to the bottom panel. The second pair of opposed walls are extended from front and rear edges, configured to collapse on top of the first pair of opposed walls using the globe. The top panel is configured to wrap around the box using one or more fasteners for securing the stability of the collapsed format.

3 Claims, 6 Drawing Sheets

(56) References Cited

U.S. PATENT DOCUMENTS

| | | | |
|---|---|---|---|
| 7,014,057 B2* | 3/2006 | Wang | B65D 5/3614 |
| | | | 220/6 |
| 2006/0151586 A1* | 7/2006 | Kao | B65D 5/6673 |
| | | | 229/117.08 |
| 2013/0193011 A1 | 8/2013 | Scanlan et al. | |
| 2017/0320615 A1 | 11/2017 | Izquierdo | |
| 2018/0127140 A1* | 5/2018 | Perella | B65D 5/3657 |
| 2018/0244424 A1* | 8/2018 | Perella | B31B 50/0044 |

FOREIGN PATENT DOCUMENTS

| | | | | |
|---|---|---|---|---|
| DE | 202004000895 U1 | 5/2004 | | |
| JP | 2012051624 A | 3/2012 | | |
| KR | 20110036292 A | 4/2011 | | |
| LU | 500218 B1 * | 11/2022 | | B65D 1/225 |
| WO | WO-2023057751 A1 * | 4/2023 | | |

\* cited by examiner

COLLAPSIBLE BOX

CROSS-REFERENCE TO RELATED APPLICATIONS

This application is the 371 National Stage of International Application No. PCT/DK2022/050025, filed Feb. 11, 2022, which claims priority to Denmark Patent Application PA 2021 00185, filed Feb. 20, 2021, the disclosures of which are incorporated herein by reference in their entirety.

TECHNICAL FIELD OF THE INVENTION

The invention disclosed herein generally relates to a collapsible box. More particularly, the present invention relates to a collapsible box for transporting commercial goods from one point to another, and when the box is empty, it can be folded to a practical format, and keep this configuration for convenient return handling, storage and shipping.

BACKGROUND

In present scenario, boxes or containers are commonly used in transporting, moving, conveying, sorting and storing goods and materials, and are employed by a diversity of industries such as trucking, warehousing, manufacturing, webshops moving and household goods moving. Conventional containers are configured to collapse in a way suitable for stacking on pallets in large quantities. The containers are stacked on pallets in a suitable way for transporting in large quantiles by a vehicle from a manufacturer to a dealer, or households. The main disadvantage of conventional containers, which are formed by a rigid prismatic structure results from the fact that after use and delivery, the size and form of the collapsed box makes it difficult to handle for individual return shipment. For example, boxes do not maintain their shape and configuration while collapsed. Consequently, boxes are often discarded rather than reused.

Other boxes are hard cases and designed for reuse but cannot collapse. Generally, the containers occupy a large volume of space and keep or maintain their shape and configuration. These containers occupy large place for the containers are inconvenient for individual handling, storing and transporting for reuse or recycling purpose. The conventional containers have some disadvantages for providing sufficient folding capacity to occupy less space, while folded or by the way/method it is folded. To overcome these problems an improved folding or collapse box or container is required.

My prior patent, DK178719 discloses a corrugated box with a unique collapsible format, which enables convenient return shipment by fitting it to the slot of a standard mailbox. Additionally, the corrugated box occupies less space and it keeps or maintains its shape and configuration while folded or by the way/method its folded. However, a reusable closing mechanism for the box could be designed only by applying a zipper or the like.

KR 20110036292 discloses a folding type storage box provided to divide the inside of the storage box using a partition plate for preventing products stored inside the storage box from being mixed.

A folding type storage box generally may include a bottom plate, a side plate, connection plates, adhering plates, magnets, cover plates, fixing plates, and partitioning plates, A side plate is connected to a bottom plate folding line. A cover plate is connected to a rear plate folding line. Magnets may be inserted into the connection plates and adhering plates.

However, abovementioned prior art fails to disclose or teach a second pair of fasteners mounted to the bottom panel, and the first pair of fasteners mate with the second pair of fasteners in the collapsed format of the box by folding the top panel over the bottom panel.

In the light of above-mentioned problems, it is desirable to provide a folding or collapsible box that allows an overlay of the parts of the collapsible box, thereby allowing the collapsible box to be closed without using a zipper. Also, there is a need for a new design of a collapsible box that has an overlap similar to the regular boxes, and therefore can be sealed with just tape or a sticker.

SUMMARY OF THE INVENTION

It is an object of the disclosure to provide a collapsible box with a minimized size of the collapsed box and having a closing mechanism that keeps the box securely and conveniently collapsed.

The present invention discloses a collapsible box comprising a bottom panel having a front edge opposite a rear edge and a right edge opposite a left edge, and an exterior surface with a fastening element; a right wall extending from the right edge and configured to fold along the right edge; a left wall extending from the left edge and configured to fold along the left edge; a front wall extending from the front edge and configured to fold along the front edge; a rear wall extending from the rear edge and configured to fold along the rear edge; a top panel extending from the rear wall and defining a first section and a second section, which first section is partitioned from the second section by a folding line, the top panel having an interior surface carrying a complementary fastening element, wherein the right wall and the left wall are configured to fold onto the bottom panel, and the top panel is configured to fold onto the right wall and the left wall when folded onto the bottom panel to provide a collapsed format, and wherein the top panel is configured to fold along the folding line in the collapsed state, such that the interior surface of the top panel at the first section abuts the exterior surface of the bottom panel, and the fastening element mates with the complementary fastening element.

The collapsible box has a right wall and a left wall. The right wall and the left wall may be referred to collectively as "side walls", and the collapsible box can be said to have a pair of opposed walls, e.g. opposed side walls. Correspondingly, the collapsible box has a front wall and a rear wall, and the front wall and the rear wall may also be referred to as a pair of opposed walls. The side walls may be referred to as the first walls, and the front and the rear wall may be referred to as the second walls. Thus, the collapsible box can be said to have a first pair of opposed walls and a second pair of opposed walls.

The walls of the collapsible box are configured to fold along the edges. Thereby, the box is collapsible. It is to be understood that the collapsible box has a collapsed state and an assembled state. In the assembled state, the opposed walls of the collapsible box form an interior compartment. The interior compartment provides a container for goods, and the collapsible box in the assembled state is useful for transporting commercial goods from one point to another, and when the box is empty, it can be folded to a practical format, i.e. the collapsed state, and keep this configuration for convenient return handling, storage and shipping. The collapsible box can be returned in a sustainable and convenient way, by simply dropping it in a mailbox.

Due to the collapsible nature of the box, the box can thus be collapsed to a collapsed state which is to be understood as the state where the side walls have been collapsed on the bottom panel, the front wall is collapsed on the side walls, and the top panel is collapsed on the side walls. The collapsed state may also be referred to as a compacted state, and in the present context the two terms may be used interchangeably. Correspondingly, the box can be in an assembled state, which is to be understood as when the walls are not collapsed on each other, e.g. the box is unfolded. The top panel may be in any state, e.g. the top panel may close the box, thereby enabling the box to enclose goods to be transported, or the top panel may not close the collapsible box in the assembled state.

In general terms, the shape of bottom panel may be considered a rectangle, e.g. the angles between the rear edge and the right edge, and between the rear edge and the left edge, may be approximately right angles, and likewise the angles between the front edge and the right edge, and between the front edge and the left edge, may be approximately right angles. The edges of the bottom panel may have any shape allowing the walls to fold along the corresponding edges. For example, the edge may follow straight lines, although other shapes are also contemplated. The bottom panel is not limited to a rectangular shape, and other shapes, in particular polygonal shapes are also contemplated.

The top panel defines a first section and a second section, which first section is partitioned from the second section by a folding line. The folding line provides flexibility and allows the top panel, e.g. the first section and the second section, to fold along the folding line. The folding line is generally a straight line, although the folding line is not limited to straight lines. The folding line may extend between two opposite edges of the top panel. In particular, the folding line may be parallel with the front edge.

The right wall, the left wall and the front wall may each be described to have a top edge. In general, the top edge is opposite to the respective edge, from which the corresponding wall extends and is configured to fold along. Thus, the right wall may have a top edge opposite the right edge of the bottom panel, the left wall may have a top edge opposite the left edge of the bottom panel, and the front wall may have a top edge opposite the front edge of the bottom panel.

In one example of the disclosure, the collapsible box may have at least one of a right flap extending from the top edge of the right wall, a left flap extending from the top edge of the left wall, and a front flap extending from the top edge of the front wall. The one or more flaps may be configured to hold the collapsible box in closed position and/or to ensure that the contents of the collapsible box remain in the collapsible box. For example, the one or more flaps may have an abutting surface abutting the interior surface of the top panel when the collapsible box is in the assembled state and the top panel closes the collapsible box. The abutting surface and the corresponding locations on the interior surface may contain appropriate fasteners.

The bottom panel has an exterior surface. The exterior surface of the bottom panel is to be understood as the side of the bottom panel facing the exterior environment when the box is in the assembled state, and the exterior surface may also be referred to as the underside of the bottom panel. The top panel has an interior surface. The interior surface of the top panel is to be understood as the side facing the interior, e.g. an interior compartment, of the box when the box is in its assembled state and the interior surface may also be referred to as the top surface of the top panel.

The collapsible box, i.e. the bottom panel, the first and second pair of opposed walls and the top panel, and any optional sections, may be made from any material. The different panels and walls may be made from the same material, but they need not be made from the same material. The material may be rigid or flexible. The material may for example be a polymeric material, cardboard, paper, wood, metal. For example, the different panels and walls may be made from boards or a material, e.g. a rigid or flexible material. In an example, the different panels and walls are made from a fabric.

The walls are configured to fold along edges, and the top panel comprises a folding line. Adjacent walls and panels may be made from separate pieces of material, e.g. plates or sheets of fabric, which are joined at the edge to allow folding along the edge. Likewise, the top panel may comprise two separate pieces of material joined at the folding line to allow folding along the folding line. It is also possible for adjacent walls and panels or for the top panel to be made from a single piece of material, e.g. plates or sheets of fabric, which is modified, e.g. weakened, along the edge or folding line to allow folding along the edge or folding line.

The exterior surface has a fastening element. The fastening element may also be referred to as a fastener, and the two terms may be used interchangeably in the present context. The interior surface has a complementary fastening element. It is to be understood that the complementary fastening element of the interior surface is complementary to the fastening element of the exterior surface. The fasteners may employ any fastening principle such as, but not limited to; push buttons, hook and loop fasteners, hook and pile fasteners, touch fasteners, magnets and combinations thereof. Thus, the fastening element may mate with the complementary fastening element, and the fastening element and the complementary fastening element can be said to be mateable. The fastening element and the complementary fastening element are preferably releasably fastenable. The exterior surface and the interior surface may comprise a plurality, e.g. a pair, of mateable fastening elements. Thus, when the bottom panel comprises two fastening elements, the fastening elements may be referred to as a first pair of mateable fasteners and the complementary fastening elements on the top panel may be referred to as a second pair of mateable fasteners. By fastening a fastening element on the top panel, i.e. on the exterior surface, with a fastening element on the bottom panel, i.e. on the interior surface, a closing mechanism is provided that can be repeatedly used, thereby enabling a cyclic lifespan of the box.

The collapsible box may comprise gusset folds. The gusset folds may also be referred to as gables. For example, the collapsible box may comprise one or more gusset folds connecting at least one of the front wall to the right wall, the front wall to the left wall, the rear wall to the right wall, and the rear wall to the left wall. In a specific example, a gusset fold connects the front wall to the right wall, a gusset fold connects the front wall to the left wall, a gusset fold connects the rear wall to the right wall, and a gusset fold connects the rear wall to the left wall. In the present context, a gusset fold is to be understood as a connecting element between two adjacent walls, where the connecting element is of a foldable nature which allows the two adjacent walls to be movable relative to each other. The gusset folds allow the collapsible box to transform from the collapsible state to the assembled state while keeping the respective walls structurally connected.

The collapsible box may further comprise a handle. The handle may be configured to hold the collapsible box. The handle may be attached to any panel or wall of the collapsible box, e.g. to the top panel. In an embodiment the handle is stitched to the left wall, the side wall, the front wall, or the rear wall. The handle may be made of any material, e.g. materials including leather, plastic, polyester and/or a fabric material. In one embodiment, the handle provides sufficient grip for the user's hand.

The collapsible box may comprise a shipping label, e.g. on the top panel. The shipping label specifies the content of the collapsible box and destination address. The collapsible box may comprise a return slip, e.g. for returning the collapsible box after shipment. The return slip simplifies reuse of the collapsible box in a sustainable and convenient manner, e.g. by simply dropping it in the mailbox. The return slip may be located anywhere on the collapsible box, e.g. a location that is visible when the box is in the collapsed state. In one embodiment, the return slip specifies details for reshipping the collapsible box to the return address, e.g. a return address or a PO. box. In one embodiment, collapsible box comprises a shipping label and a return slip, and the return slip is attached to the shipping label.

In one embodiment, the return slip is not visible when the collapsible box is in the assembled state but is visible when the collapsible box is in the collapsed state. In one embodiment, the return slip is releasably attached to the collapsible box.

In another example, the disclosure provides a collapsible box used for transporting commercial goods from one point to another, comprising,
a top panel having at least two sections including a first section and a second section;
a bottom panel having a front edge, a rear edge, a right edge, and a left edge; a first pair of opposed walls including right and left walls, wherein the first pair of opposed side walls collapse on the bottom panel;
a second pair of opposed walls including front and rear walls, wherein the front wall collapses on top of the first pair of opposed walls collapsed on the bottom panel and;
wherein the bottom panel is subjected to at least two folds to reach the second section of the top panel, and the top panel is in out folded position and extending from the rear wall to wrap around the collapsible box for securing stability of the collapsed format,
the collapsible box having: a first pair of fasteners mounted to the top panel and a second pair of fasteners mounted to the bottom panel, wherein the first pair of fasteners mate with the second pair of fasteners by folding the top panel over the bottom panel, thereby the collapsible box configured for securely transporting commercial goods from one point to another, and when the box is empty, it can be folded to a practical format, and keep this configuration for convenient return handling, storage and shipping.

The collapsible box may for example further comprise a gable between the edges and configured to enable the folding of the first pair of opposed side walls and the second pair of opposed side walls.

In a further example of the collapsible box, the first section of the top panel is folded over the folded bottom panel to wrap around the collapsible box.

In yet a further example of the collapsible box the first pair of opposed side walls are extending from the right and left edges of the bottom panel, respectively.

In yet a further example of the collapsible box, the second pair of opposed side walls is extending from the front and rear edges of the bottom panel, respectively.

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The present invention discloses a collapsible box for transporting commercial goods from one point to another, and when the box is empty, it can be folded to a practical format, and keep this configuration for convenient return handling, storage and shipping. In one embodiment, the collapsible box enables that to be returned in a sustainable and convenient way, by simply dropping it in a mailbox. In one embodiment, the collapsible box comprises a top panel and a bottom panel. The top panel comprises at 3 least two sections including a first section and a second section. The bottom panel comprises a front edge, a rear edge, a right edge, and a left edge.

In one embodiment, the collapsible box further comprises two sets of side walls such as a first pair of opposed walls and a second pair of opposed walls. The first pair of opposed walls include a right side wall and a left side wall. The second pair of opposed walls include front wall and a rear wall. In one embodiment, each side wall has a flap extending from the upper end of the walls configured to hold the collapsible box in closed position. In one embodiment, the first pair of opposed walls are extending from the right and left edges of the bottom panel. In one embodiment, the second pair of opposed walls are extending from the front and rear edges of the bottom panel. In one embodiment, the collapsible box could be a foldable collapsible box. In one embodiment, the collapsible box further comprises a gable between the edges configured to enable the folding of the first pair of opposed side walls and the second pair of opposed side walls.

In one embodiment, the first pair of opposed walls are configured to collapse or fold down to the bottom panel. In one embodiment, the second pair of opposed walls are configured to fold down on top of the first pair of opposed walls using the gables. In one embodiment, the bottom panel is folded to reach the second section of the top panel. In one embodiment, the top panel is configured to fold outwardly and extending from the second pair of opposed walls. In one embodiment, the top panel is wrapped around the collapsible box for securing stability of the collapsed format.

In one embodiment, the collapsible box further comprises one or more fasteners having a first pair of fasteners and a second pair of fasteners. In one embodiment, the first pair of fasteners are mounted to the top panel and the second pair of fasteners are mounted to the bottom panel. In one embodiment, the first pair of fasteners mate with the second pair of fasteners by folding the top panel over the bottom panel, thereby the collapsible box configured to provide for securely transporting commercial goods from 4 one point to another, and when the box is empty, it can be folded to a practical format, and keep this configuration for convenient return handling, storage and shipping.

In one embodiment, the collapsible box further comprises a handle. In one embodiment, the handle is configured to hold the collapsible box. In one embodiment, the handle is attached to the top of the top panel. In one embodiment, the ends of the handle are stitched to the one of the second pair of opposed walls. In one embodiment, the handle is made of any one of a material includes a leather, a plastic, a polyester and a fabric material. In one embodiment, the handle provides sufficient grip to the user's hand.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE INVENTION

Figure 1:
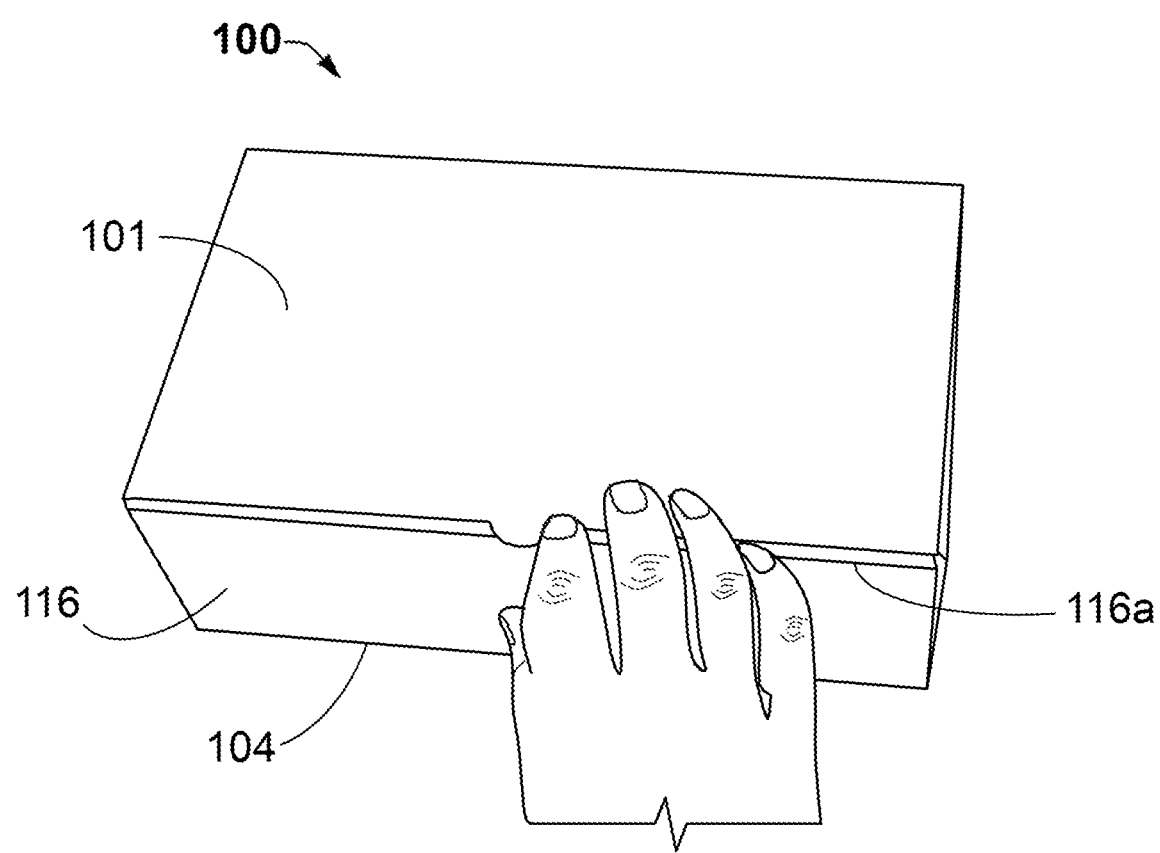
FIG. 1 exemplarily illustrates a perspective view of a collapsible box in a closed position in an embodiment of the present invention.

Turning first to FIG. 1 a collapsible box 100 is shown in an assembled state with a closed top panel 101 thereby enclosing an interior compartment of the collapsible box 100. The interior compartment is not shown in FIG. 1. A front edge 104 can be seen, from which a front wall 116 extends. Opposite the front edge 104 a top edge of the front wall 116a can be seen in proximity to the top panel 101.

Figure 2:
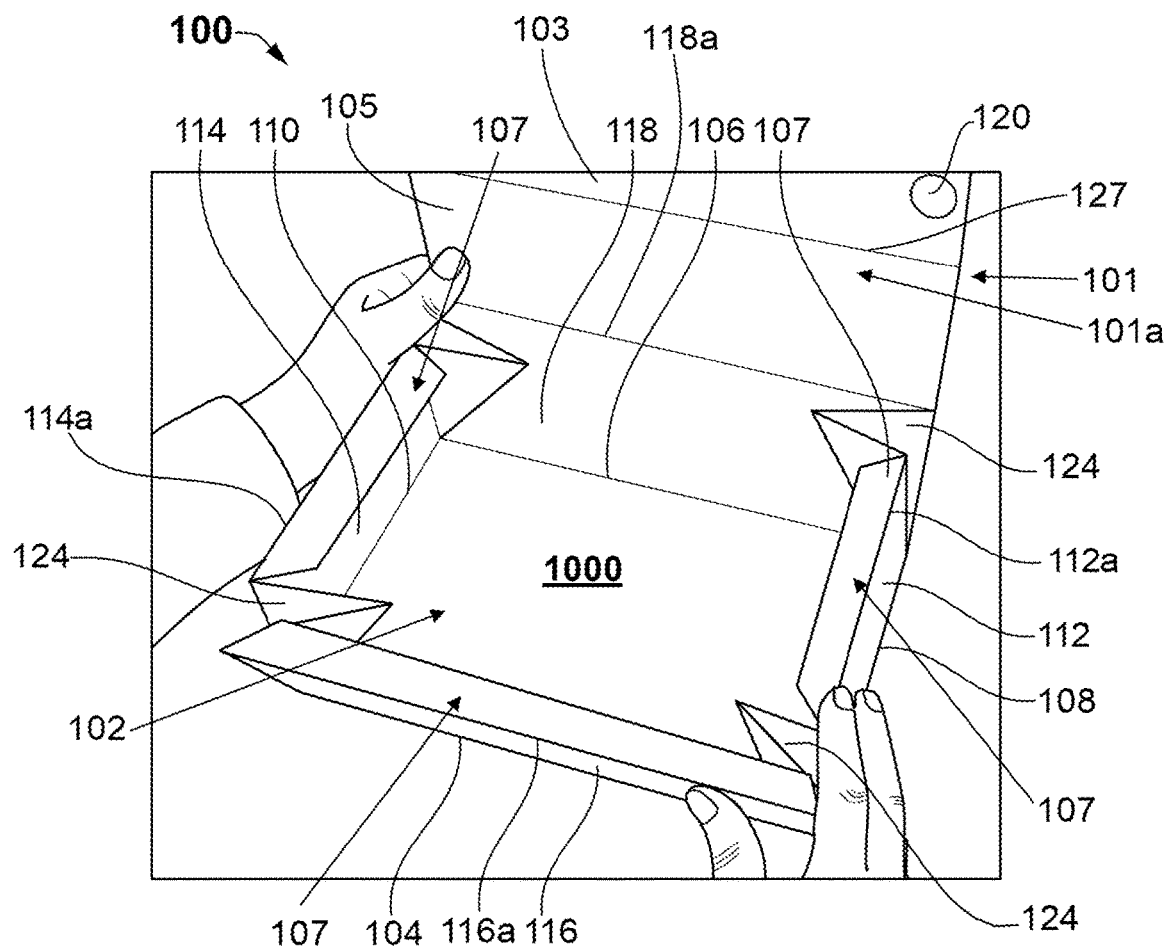
FIG. 2 exemplarily illustrates a perspective view of the collapsible box in an open position in an embodiment of the present invention FIG. 3 exemplarily illustrates a top perspective view of the collapsible box with folded side walls in an embodiment of the present invention.

Turning to FIG. 2, the top panel 101 is lifted and FIG. 2 reveals an interior compartment 1000 of the collapsible box 100. An interior surface of the bottom panel 102 can be seen with a front edge 104 and a rear edge 106, a right edge 108 and a left edge 110. From these edges extend a front wall 116, a rear wall 118, a right wall 112 and a left wall 114, respectively. Each of the walls 116, 118, 112, 114 is shown with a corresponding top edge 116a, 118a, 112a, 114a and flaps 107 can be seen extending from the front wall 116, the right wall 112 and the left wall 114, respectively. The top panel 101 is seen extending from the rear wall 118 where the top panel 101 is partitioned by a folding line 127 separating a first section 103 from a second section 105 of the top panel 101.

Gusset folds 124 can be seen connecting the walls 116, 118, 112, and 114, which in this embodiment are shown in a partly unfolded state thereby showing how the gusset folds 124 can be unfolded allowing the walls 116, 118, 112, 114 to collapse. A fastening element 120 can be seen on the interior surface 101a of the top panel 101.

Figure 3:
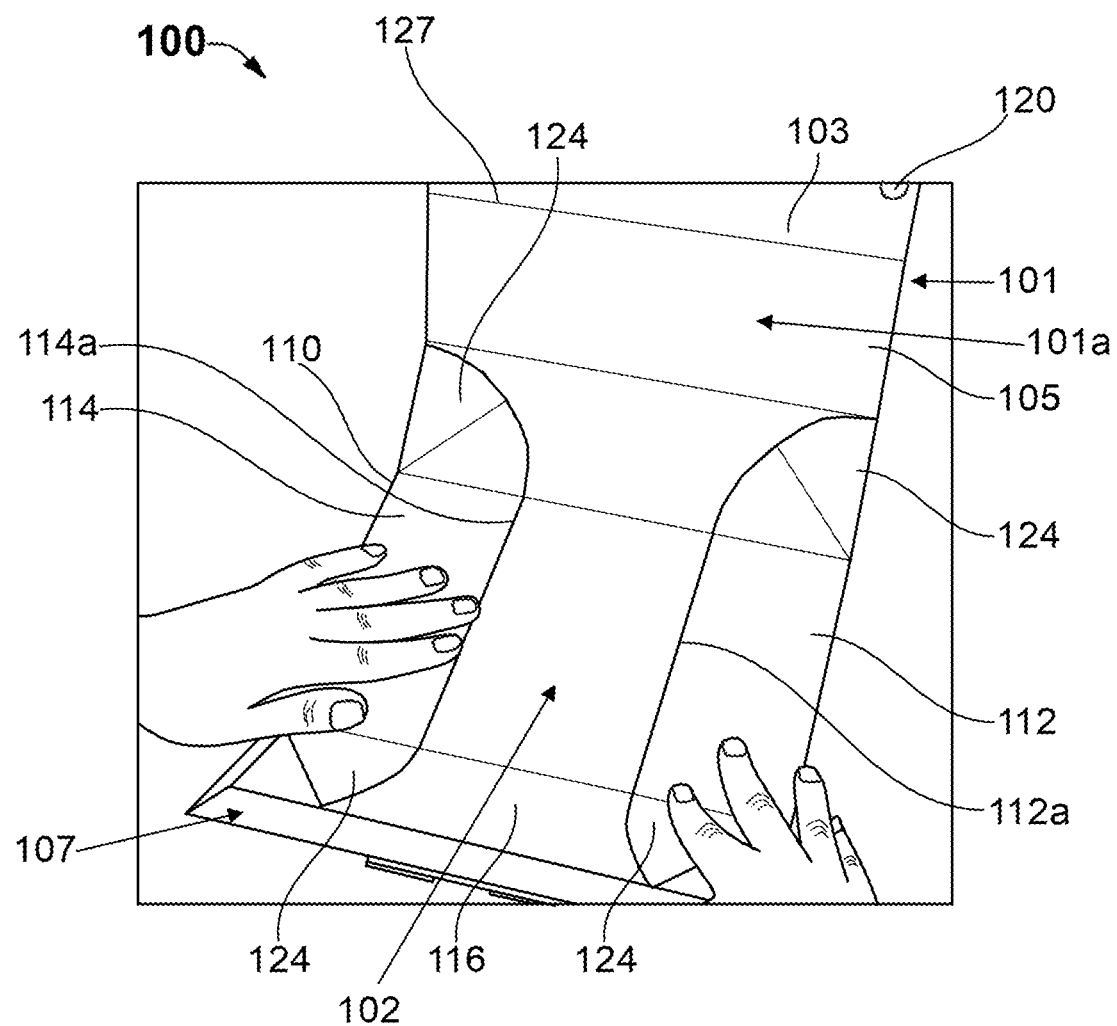
Figure 4:
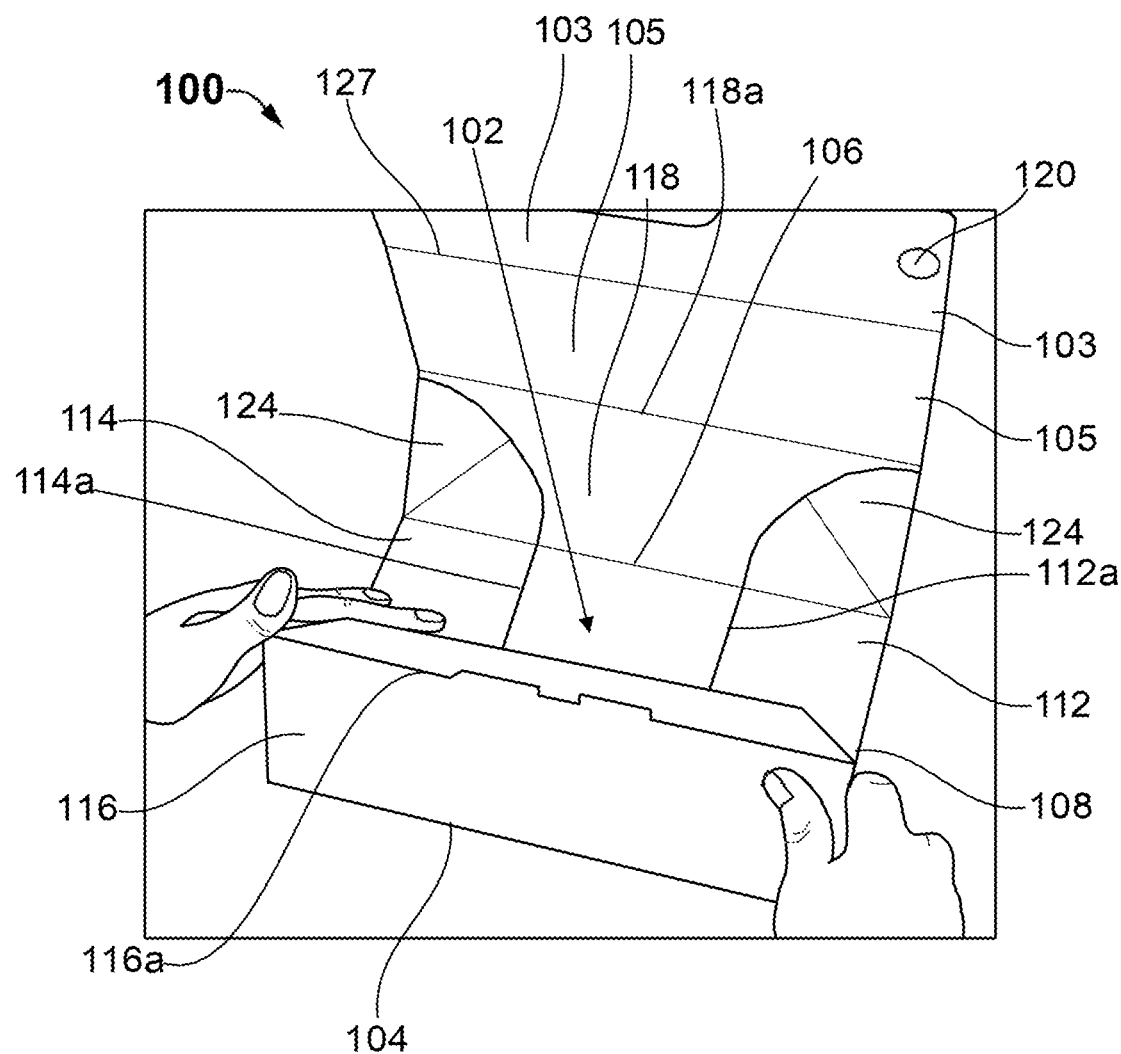
FIG. 4 exemplarily illustrates a top perspective view of the collapsible box with folded front wall in an embodiment of the present invention.

Looking now at FIG. 3 the collapsible box 100 can be seen with the gusset folds 124 completely unfolded. The right wall 112 and the left wall 114 are in this embodiment collapsed on the bottom panel 102. From this state the front wall 116 is folded on to the right wall 112 and the left wall 114 as seen in FIG. 4.

Figure 5:
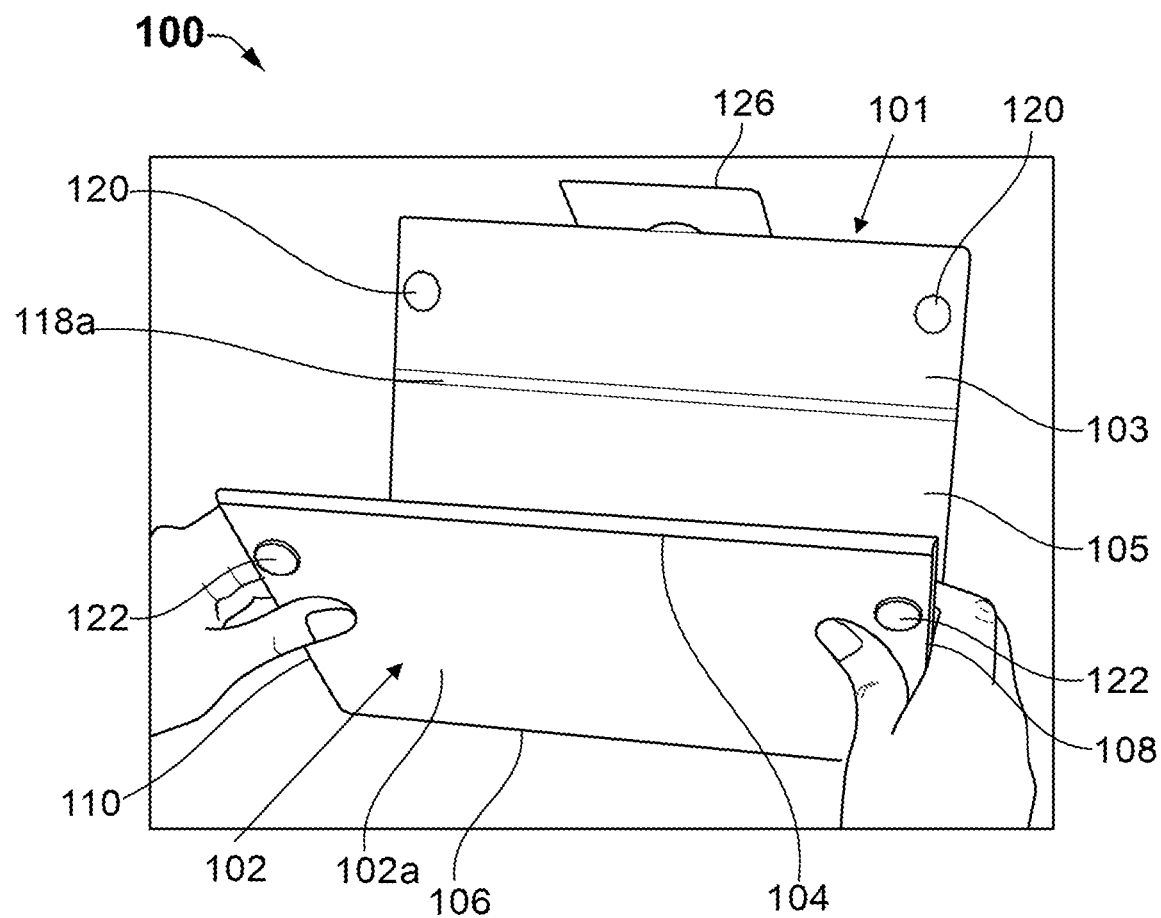
FIG. 5 exemplarily illustrates a top perspective view of the collapsible box with the folded bottom wall in an embodiment of the present invention.

Referring to FIG. 5, the right wall 112 and the left wall 114 are to be imagined as collapsed on the interior side of the bottom panel 102 and the front wall 116 as collapsed on the right wall 112 and the left wall 114. An exterior surface 102a of the bottom panel 102 with complementary fastening elements 122 is revealed. Additionally, a handle 126 according to one embodiment of the invention can be seen.

Figure 6:
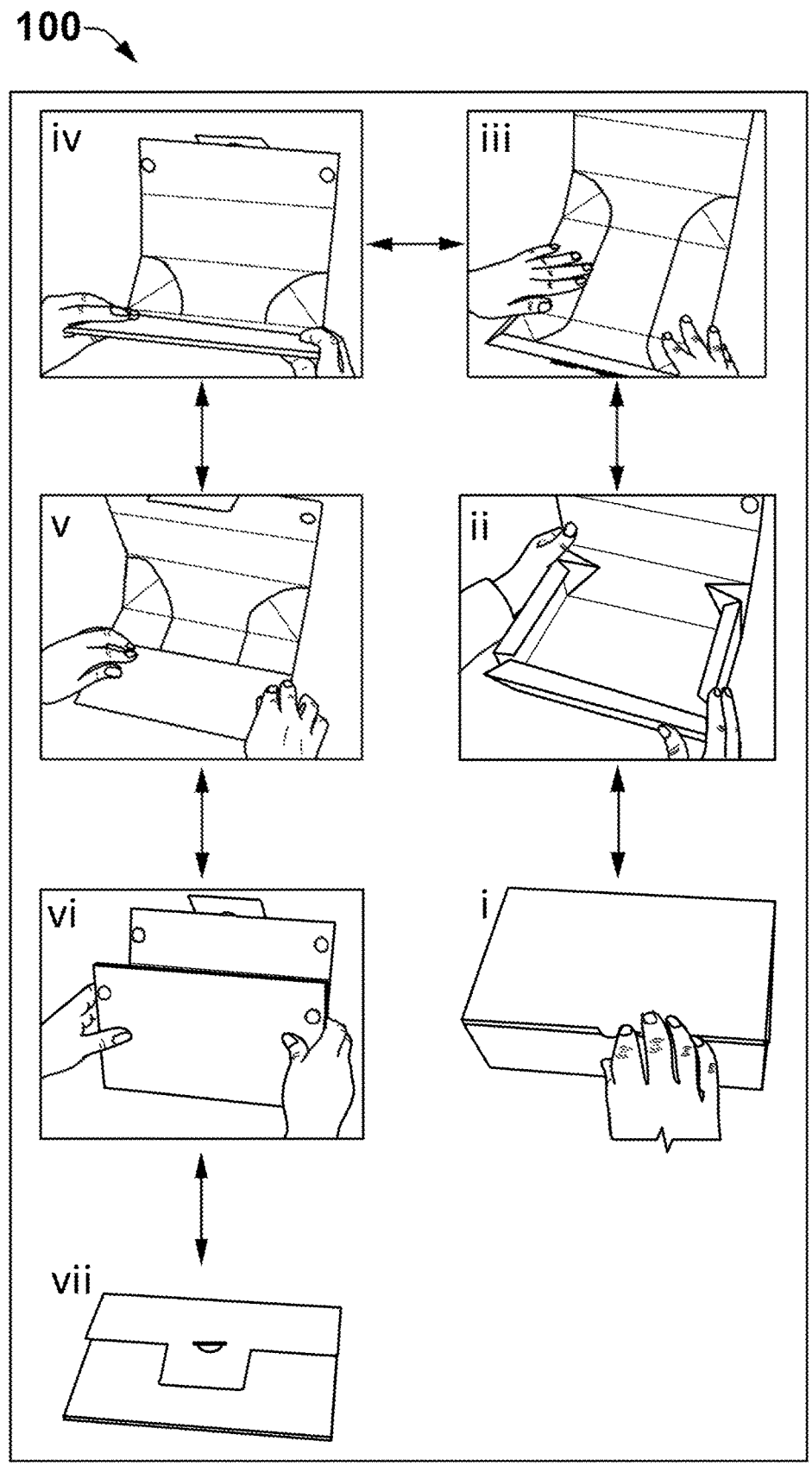
FIG. 6 exemplarily illustrates one or more steps for folding the collapsible box in one embodiment of the present invention.

Turning to FIG. 6, seven different states of the collapsible box 100 can be seen with arrows indicating how to arrive at the different states.

Starting from FIG. 6i the collapsible box 100 is in its assembled state with the top panel 101 closed as also shown similarly in FIG. 1. From the assembled state the top panel 101 is lifted in FIG. 6ii and reveals the interior compartment 1000 and the bottom panel 102 of the collapsible box 100. In FIG. 6iii the right wall 112 and the left wall 114 are collapsed onto the bottom panel 102 and in FIG. 6iv the collapsible box 100 can be seen from a front perspective view where the front wall 116 is collapsed on the right wall 112 and the left wall 114. A similar state of the collapsible box 100 known from FIG. 6iv is shown from a top perspective view in FIG. 6v. In FIG. 6vi the collapsible box 100 is seen in its collapsed state with the top panel 101 collapsed on the right wall 112, the left wall 114, and the front wall 116, revealing the exterior surface 102a of the bottom panel 102 with fastening elements 120 and the interior surface 101a of the top panel 101 with complementary fastening elements 122. In FIG. 6vii the top panel 101 is folded along the folding line 127 and the interior surface 101a of the top panel abuts the exterior surface 102a of the bottom panel.

In addition, FIGS. 1 and 2 show a perspective view of a collapsible box 100 in a closed position and an open position respectively, according to one embodiment of the present invention. The collapsible box 100 is configured for securely transporting commercial goods from one point to another, and when the box is empty, it can be folded to a practical format, and keep this configuration for convenient return handling, storage and shipping. In one embodiment, the collapsible box 100 enables that to be returned in a sustainable and convenient way, by simply dropping it in a mailbox. In one embodiment, the collapsible box 100 comprises a top panel 101 and a bottom panel 102. The top panel 101 comprises at least two sections including a first section 103 and a second section 105. The bottom panel 102 comprises a front edge 104, a rear edge 106, a right edge 108, and a left edge 110.

In one embodiment, the collapsible box 100 further comprises two sets of side walls such as a first pair of opposed walls and a second pair of opposed walls. The first pair of opposed walls include a right side wall 112 and a left side wall 114. The second pair of opposed walls include front wall 116 and a rear wall 118. In one embodiment, each side wall (112, 114, 116, and 118) has a flap 107 extending from the upper end of the walls (112, 114, 116, and 118) configured to hold the collapsible box 100 in closed position. In one embodiment, the first pair of opposed walls (112 and 114) are extending from the right and left edges (108 and 110) of the bottom panel 102. In one embodiment, the second pair of opposed walls (116 and 118) are extending from the front and rear edges (104 and 106) of the bottom panel 102. In one embodiment, the collapsible box 100 could be a foldable collapsible box.

Referring to FIGS. 3-4, folding of opposed side walls of the collapsible box 100, according to one embodiment of the present invention. FIG. 3 illustrates the folded first pair of opposed side walls (112 and 114) in one embodiment of the present invention. FIG. 4 illustrates the folded front wall 116 in one embodiment of the present invention. In one embodiment, the first pair of opposed walls (112 and 114) are configured to collapse or fold down to the bottom panel 102. In one embodiment, the second pair of opposed walls (116 and 118) are configured to fold down on top of the first pair of opposed walls (112 and 114).

In one embodiment, the bottom panel 102 is folded to reach the second section 105 of the top panel 101. In one embodiment, the top panel 101 is configured to fold outwardly and extending from the second pair of opposed walls (116 and 118). In one embodiment, the top panel 101 is wrapped around the collapsible box 100 for securing stability of the collapsed format. In one embodiment, the collapsible box 100 further comprises a gable 124 between the edges (104, 106, 108, and 110) configured to enable the folding of the first pair of opposed side walls (112 and 114) and the second pair of opposed side walls (116 and 118).

FIG. 5 illustrates a perspective view of the folded bottom wall 118, according to one embodiment of the present invention. In one embodiment, the collapsible box 100 further comprises one or more fasteners having a first pair of fasteners 120 and a second pair of fasteners 122. In one embodiment, the first pair of fasteners 120 are mounted to the top panel 101 and the second pair of fasteners 122 are mounted to the bottom panel 102. In one embodiment, the first pair of fasteners 120 mate with the second pair of fasteners 122 by folding the top panel 101 over the bottom panel 102, thereby the collapsible box 100 is configured for securely transporting commercial goods from one point to another, and when the box is empty, it can be folded to a practical format, and keep this configuration for convenient return handling, storage and shipping.

In one embodiment, the collapsible box 100 further comprises a handle 126. In one embodiment, the handle 126 is configured to hold the collapsible box 100. In one embodiment, the handle 126 is attached to the top of the top panel 101. In one embodiment, the ends of the handle 126 are stitched to the one of the second pair of opposed wall 118. In one embodiment, the handle 126 is made of any one of a material includes a leather, a plastic, a polyester and a fabric material. In one embodiment, the handle 126 provides sufficient grip to the user's hand.

Referring to FIG. 6, exemplarily illustrates a series of steps involve in the folding technique, according to one embodiment of the present invention. The folding technique enables the collapsible box 100 to take a collapsed form to a suitable box for shipping or storage of articles via a standard mailbox. The folding technique is optimized for allowing the folded collapsible box 100 to collapse in a format suitable to return in a sustainable and convenient way, by simply dropping it in a mailbox.

In one embodiment, the first folding technique includes various steps such as, at one step, the closed collapsible box 100 is opened. At another step, the first pair of opposed walls (112 and 114) are folded down to the bottom panel 102 using the gables 124. At another step, the front wall 116 is folded down to the first pair of opposed walls (112 and 114) using the globes 124. In one embodiment, each side wall (112, 114, 116, and 118) has a flap 107 extending from the upper end of the walls (112, 114, 116, and 118) configured to hold the collapsible box 100 in closed position. At another step, the bottom panel 102 is folded to reach the walls second section 105 of the top panel 101. At another step, the top panel 101 is folded to wrap around the collapsible box 100. In one embodiment, the top panel 101 is in out folded position and extending from the rear wall 118 to wrap around the collapsible box 100 for securing stability of the collapsed format.

In one embodiment, the fasteners (120 and 122) are provided to the collapsible box 100 for securing stored the articles. In one embodiment, the collapsible box 100 is reconfigurable between different states. The fasteners (120 and 122) could be, but not limited to, push buttons or hook and loop fasteners. In one embodiment, the fasteners (120 and 122) but not limited to, hook-and-loop fasteners, hook-and-pile fasteners and touch fasteners. In one embodiment, the collapsible box 100 to be folded into a compacted state, thereby snugly positioning the first pair of fasteners 120 with the second pair of fasteners. If the collapsible box 100 is in the closed position, then it prevents the collapsible box 100 from being folded into the compacted state.

In one embodiment, the collapsible box 100 further comprises a shipping label is attached on the top panel 101 of the collapsible box 100. The shipping label specifies contents of the collapsible box 100 and destination address. In one embodiment, the collapsible box 100 further comprises a return slip to return the collapsible 100 after shipment, in order to reuse in a sustainable and convenient way, by simply dropping it in the mailbox. In one embodiment, the return slip could be attached to the shipping label. In another embodiment, the return slip could be located at anywhere on the collapsible box 100 that could be visible when the box 100 is in folded or collapsed configuration. In one embodiment, the return slip specifies a return address or PO. box details for reshipping the collapsible box 100 to the address. In one embodiment, the return slip is not visible when the collapsible box 100 is in box configuration, but it is visible when the collapsible box 100 is folded or collapsed configuration. In one embodiment, the return slip is releasably attached to the collapsible box 100 and is removable therefrom.

Advantageously, the collapsed format is easily secured and therefore the collapsible box 100 could be handled as a standard package and also in its collapsed format, thereby a sustainable and commercially feasible return process is made possible for collapsible box 100. Furthermore, the design enables a minimum of material used to form the collapsible box 100, resulting in a minimized weight and a more sustainable production. The collapsible box 100 requires less space while storing and shipping or transporting by vehicles. In one embodiment, the collapsible box 100 could be used as, but not limited to, a storage bag, a travel bag, etc. In one embodiment, the manufacturer or trader could sell this collapsible box 100 as a return-packing bag for articles, and can occupy less space and keeps or maintains its shape and configuration, while folded or by the way/method its folded in the market.

The foregoing examples have been provided merely for the purpose of explanation and are in no way to be construed as limiting of the present concept disclosed herein. While the concept has been described with reference to various embodiments, it is understood that the words, which have been used herein, are words of description and illustration, rather than words of limitation. Further, although the concept has been described herein with reference to particular means, materials, and embodiments, the concept is not intended to be limited to the particulars disclosed herein; rather, the concept extends to all functionally equivalent structures, methods and uses, such as are within the scope of the appended claims. Those skilled in the art, having the benefit of the teachings of this specification, may affect numerous modifications thereto and changes may be made without departing from the scope and spirit of the concept in its aspects.

What is claimed is:

1. A collapsible box comprising;
   a bottom panel having a front edge opposite a rear edge and a right edge opposite a left edge, and an exterior surface with a fastening element;
   a right wall extending from the right edge and configured to fold along the right edge;
   a left wall extending from the left edge and configured to fold along the left edge;
   a front wall extending from the front edge and configured to fold along the front edge;
   a rear wall extending from the rear edge and configured to fold along the rear edge;
   a top panel extending from the rear wall and defining a first section and a second section, which first section is partitioned from the second section by a folding line, the top panel having an interior surface carrying a complementary fastening element,
   wherein the right wall and the left wall are configured to fold onto the bottom panel, and the top panel is configured to fold onto the right wall and the left wall when folded onto the bottom panel to provide a collapsed state, and
   wherein the top panel is configured to fold along the folding line in the collapsed state, such that the interior surface of the top panel at the first section abuts the exterior surface of the bottom panel, and the fastening element mates with the complementary fastening element.

2. The collapsible box according to claim 1, further comprising one or more gusset folds connecting at least one of the front wall to the right wall, the front wall to the left wall, the rear wall to the right wall, and the rear wall to the left wall.

3. The collapsible box according to claim 1, wherein the first section of the top panel is folded over the folded bottom panel to wrap around the collapsible box.

* * * * *